United States Patent
Brunel

(10) Patent No.: US 8,642,003 B2
(45) Date of Patent: Feb. 4, 2014

(54) PHOSPHINE-OXIDE CATALYZED PROCESS OF PRODUCTION OF HYDROGEN FROM SILYLATED DERIVATIVES AS HYDROGEN CARRIER

(75) Inventor: Jean-Michel Brunel, Marseilles (FR)

(73) Assignees: Universite d'Aix-Marseille, Marseilles (FR); Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 13/578,860

(22) PCT Filed: Feb. 15, 2011

(86) PCT No.: PCT/EP2011/052192
§ 371 (c)(1),
(2), (4) Date: Apr. 10, 2013

(87) PCT Pub. No.: WO2011/098614
PCT Pub. Date: Aug. 18, 2011

(65) Prior Publication Data
US 2013/0189183 A1    Jul. 25, 2013

Related U.S. Application Data

(60) Provisional application No. 61/304,595, filed on Feb. 15, 2010.

(51) Int. Cl.
*C01B 3/22* (2006.01)
(52) U.S. Cl.
USPC .................. 423/648.1; 252/183.13; 422/129; 422/224
(58) Field of Classification Search
None
See application file for complete search history.

(56) References Cited

U.S. PATENT DOCUMENTS

2010/0255392 A1* 10/2010 Spear et al. .................. 429/421
2010/0316562 A1* 12/2010 Carruthers et al. ........ 423/648.1

FOREIGN PATENT DOCUMENTS

| DE | 102006030798 A1 | | 1/2008 |
| WO | WO 2005/037421 | * | 4/2005 |
| WO | WO 2007019172 A2 | | 2/2007 |
| WO | WO 2008094840 A2 | | 8/2008 |

OTHER PUBLICATIONS

International Search Report and Written Opinion of corresponding PCT/EP2011/052192 dated Apr. 21, 2011, 5 pages.
Anderson, "n-Butylhalosilanes. Determination of Silane Hydrogen in Liquids", Journal of the American Chemical Society, Mar. 20, 1960, pp. 1323-1325, vol. 82, No. 6.
Nebergall, "Some Reactions of Phenylsilane", Journal of the American Chemical Society, Oct. 10, 1950, pp. 4702-4704, Vo. 72, No. 10.
Sada et al., "Removal of Silane Gas by Absorption into Alkaline Solutions: Alkaline Hydrolysis of Silane", Chem. Eng, Comm., 1987, pp. 95-104, vol. 57.

* cited by examiner

*Primary Examiner* — Melvin C Mayes
*Assistant Examiner* — Douglas Call
(74) *Attorney, Agent, or Firm* — Thompson Coburn LLP

(57) ABSTRACT

The invention relates to a method for producing hydrogen comprising the steps of:
i) contacting a compound (C) comprising one or more groups Si—H with a phosphorous based catalyst in the presence of a base in water as solvent, thereby forming hydrogen and a by-product (C1);
wherein said phosphorous based catalyst is as defined in claim 1; and
ii) recovering the obtained hydrogen.

20 Claims, No Drawings

PHOSPHINE-OXIDE CATALYZED PROCESS OF PRODUCTION OF HYDROGEN FROM SILYLATED DERIVATIVES AS HYDROGEN CARRIER

CROSS-REFERENCE TO RELATED APPLICATIONS

This application is a National Stage application of International Patent Application No. PCT/EP2011/052192, filed on Feb. 15, 2011 and incorporated by reference herein in its entirety, which claims the benefit of U.S. Provisional Application No. 61/304,595 filed Feb. 15, 2010 and incorporated by reference herein in its entirety.

FIELD OF THE INVENTION

The invention relates to an experimental phosphine-oxide catalyzed process of production of hydrogen, notably from silylated derivatives as hydrogen carrier.

BACKGROUND OF THE INVENTION

The ability to produce and store hydrogen efficiently, economically and safely, is one of the challenges to be overcome to make hydrogen an economic source of energy. There have been described the limitations in the current commercialization of fuel cells, and internal combustion engines fueled with hydrogen.

The hydrogen storage methodologies span many approaches, including high pressures and cryogenics, but usually focus on chemical compounds that reversibly release $H_2$ upon heating. Hydrogen storage is a topical goal in the development of a hydrogen economy. Most research into hydrogen storage is focused on storing hydrogen in a lightweight, compact manner for mobile applications. Hydrocarbons are stored extensively at the point of use, be it in the gasoline tanks of automobiles. Hydrogen, in comparison, is quite difficult to store or transport with current technology. Hydrogen gas has good energy density by weight, but poor energy density by volume versus hydrocarbons, hence it requires a larger tank to store. Increasing gas pressure would improve the energy density by volume, making for smaller, but not lighter container tanks. Thus, higher compression will mean more energy lost to the compression step.

Alternatively, metal hydrides, with varying degrees of efficiency, can be used as a storage medium for hydrogen. Some are easy-to-fuel liquids at ambient temperature and pressure, others are solids which could be turned into pellets. Proposed hydrides for use in a hydrogen economy include simple hydrides of magnesium or transition metals and complex metal hydrides, typically containing sodium, lithium, or calcium and aluminium or boron. These materials have good energy density by volume, although their energy density by weight is often worse than the leading hydrocarbon fuels. Furthermore, high temperatures are often required to release their hydrogen content. Solid hydride storage is a leading contender for automotive storage. A hydride tank is about three times larger and four times heavier than a gasoline tank holding the same energy. For a standard car, that's about 0.17 $m^3$ of space and 270 kg versus 0.057 $m^3$ and 70 kg. Lithium, the primary constituent by weight of a hydride storage vessel, currently costs over 90 $/kg. Any hydride will need to be recycled or recharged with hydrogen, either on board the automobile or at a recycling plant. A metal-oxide fuel cell, (i.e. zinc-air fuel cell or lithium-air fuel cell), may provide a better use for the added weight, than a hydrogen fuel cell with a metal hydride storage tank. Often hydrides react by combusting rather violently upon exposure to moist air, and are quite toxic to humans in contact with the skin or eyes, hence cumbersome to handle (see borane, lithium aluminum hydride). For this reason, such fuels, despite being proposed and vigorously researched by the space launch industry, have never been used in any actual launch vehicle. Few hydrides provide low reactivity (high safety) and high hydrogen storage densities (above 10% by weight). Leading candidates are sodium borohydride, lithium aluminum hydride and ammonia borane. Sodium borohydride and ammonia borane can be stored as a liquid when mixed with water, but must be stored at very high concentrations to produce desirable hydrogen densities, thus requiring complicated water recycling systems in a fuel cell. As a liquid, sodium borohydride provides the advantage of being able to react directly in a fuel cell, allowing the production of cheaper, more efficient and more powerful fuels cells that do not need platinum catalysts. Recycling sodium borohydride is energy expensive and would require recycling plants. More energy efficient means of recycling sodium borohydride are still experimental. Recycling ammonia borane by any means is still experimental. Hydrogen produced for metal hydride storage must be of a high purity. Contaminants alter the nascent hydride surface and prevent absorption. This limits contaminants to at most 10 ppm oxygen in the hydrogen stream, with carbon monoxide, hydrocarbons and water at very low levels. An alternative to hydrides is to use regular hydrocarbon fuels as the hydrogen carrier. Then a small hydrogen reformer would extract the hydrogen as needed by the fuel cell. However, these reformers are slow to react to changes in demand and add a large incremental cost to the vehicle powertrain. Direct methanol fuel cells do not require a reformer, but provide a lower energy density compared to conventional fuel cells, although this could be counter balanced with the much better energy densities of ethanol and methanol over hydrogen. Alcohol fuel is a renewable resource. Solid-oxide fuel cells can operate on light hydrocarbons such as propane and methane without a reformer, or can run on higher hydrocarbons with only partial reforming, but the high temperature and slow startup time of these fuel cells are problematic for automotive applications. Some other hydrogen carriers strategies including carbon nanotubes, metal-organic frameworks, doped polymers, glass microspheres, phosphonium borate, imidazolium ionic liquids, amine borane complexes have been investigated with moderate results. On the other hand, ammonia has been investigated as a potent hydrogen precursor. Thus, Ammonia ($NH_3$) releases $H_2$ in an appropriate catalytic reformer. Ammonia provides high hydrogen storage densities as a liquid with mild pressurization and cryogenic constraints: It can also be stored as a liquid at room temperature and pressure when mixed with water. Nevertheless, ammonia is a toxic gas at normal temperature and pressure and has a potent odor.

The patent application WO 2008/094840 discloses a method for producing hydrogen from hydrolysis of organosilane compounds in the presence of a sodium hydroxide solution and a catalyst consisting of a substoichiometric amount of an organic amine, notably the n-octylamine and n-propylamine. However, some of the used organosilane compounds such as siloxene are expensive and quite toxic. Furthermore, such compounds often lead to the formation of not environment-friendly by-products of which recycling has not been completely envisioned and appears quite difficult and expensive.

There remains a need for further improvements in efficiency, performance, and cost effectiveness of such clean energy sources, for a variety of applications, such as portable and stationary fuels cells or emissions control system for motor vehicles. There remains a need for improvements which exhibit enhanced efficiency, performance and that are cost effective.

It now has been discovered that by using a phosphorous based catalysts in a basic aqueous solvent, hydrogen could be produced in large amounts, with high yields, in a very short time and with very low production costs. More particularly, hydrogen may be advantageously produced in one step from unexpensive commercially available products. Further, this method can be easily scaled up.

Thus, in one aspect, the invention is directed to a method for producing hydrogen ($H_2$) comprising the steps consisting in:
i) contacting a compound (C) comprising one or more groups Si—H with a phosphorous based catalyst in the presence of a base in water as a solvent, thereby forming hydrogen and a by-product (C1);
wherein said phosphorous based catalyst is selected from:
a compound of formula $X^1X^2X^3P(=O)$ wherein:
$X^1, X^2, X^3$ are each, independently selected from $C_1$-$C_6$ alkyl, $C_1$-$C_6$ alkoxy, $NR^aR^b$, $C_6$-$C_{10}$ aryl, aralkyl, 5 to 7 membered heteroaryl;
wherein said alkyl or aryl groups are optionally substituted by one to three $R^c$;
or
$X^1$ and $X^2$ together form with the phosphorous atom to which they are attached a 3 to 10 membered heterocycloalkyl optionally substituted by $R^d$; and $X^3$ is defined as above; or $X^3$ is -L-P(=O)$X^1X^2$, wherein L is $C_1$-$C_6$ alkylene or $C_6$-$C_{10}$ arylene and $X^1, X^2$ are as defined above;
$R^a$ and $R^b$ are each independently selected from $C_1$-$C_6$ alkyl, $C_6$-$C_{10}$ aryl or together form with the phosphorous atom to which they are attached a heterocyclyl optionally substituted by one to three $R^e$;
$R^c, R^d$ and $R^e$ are each independently selected from Cl, Br, I, F, OH, $C_1$-$C_6$ alkyl, $C_1$-$C_6$ alkoxy, $NO_2$, $NH_2$, CN, COOH;
a polymer-supported catalyst bearing one or more groups $R^aR^b(P=O)$—, $R^aR^b$ being as defined hereabove;
ii) recovering the obtained hydrogen.

Preferably, one of $X^1, X^2, X^3$ is $NR^aR^b$.

Preferably, $R^a$ and/or $R^b$ is/are $C_1$-$C_6$ alkyl, or heterocycloakyl, more preferably $C_1$-$C_6$ alkyl.

Preferably, the phosphorous based catalyst is (O=)P$(NR^aR^b)_3$

In a particularly preferred embodiment, the phosphorous based catalyst is hexamethylphosphoramide (HMPA).

In a variant, the catalyst is grafted onto a polymer such as (Aminomethyl)polystyrene, also referred to as polystyrene AM-$NH_2$.

The molar ratio of the phosphorous based catalyst relative to compound (C) ranges preferably from 0.01 to 0.5 equivalents, most preferably from 0.01 to 0.1 equivalents.

Preferably, the base is a mineral base, notably an alkaline or alkaline-earth metal hydroxide, such as potassium hydroxide or sodium hydroxide, the sodium hydroxide being particularly preferred.

Preferably, the hydroxide aqueous solution has a concentration ranging from 5 to 40% in water (weight/weight).

The temperature of the reaction in step a) of the method according to the invention may vary in a wide range, and may range notably from 0 to 200° C. More preferably, the temperature ranges from 15 to 30° C. and is most preferably of about 20° C.

Preferably, the compound (C) comprises at least two groups Si—H.

Preferably, the compound (C) comprises one or more monomer units of formula (A):

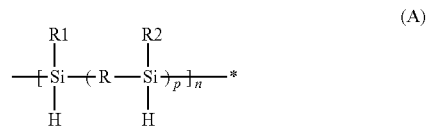

wherein:
R is a bond, $C_1$-$C_6$ alkylene, $(C_1$-$C_4$ alkylene$)_m$-Z—$(C_1$-$C_4$ alkylene$)_q$;
Z is O, $NR^{10}$, $S(O)_y$, $CR^{10}=CR^{10}$, C≡C, $C_6$-$C_{10}$ arylene, 5-10 membered heteroarylene, or $C_3$-$C_6$ cycloalkylene;
$R^1, R^2$ are each independently selected from H, halogen, $C_1$-$C_{10}$ alkyl, $C_3$-$C_{10}$ cycloalkyl, $C_6$-$C_{12}$ aryl, aralkyl, 5 to 10-membered heteroaryl, $OR^3$, $NR^4R^5$, $SiR^6R^7R^8$, wherein said aryl groups are optionally substituted by one to three $R^9$ groups;
$R^3$ is H, $C_1$-$C_6$ alkyl, $C_6$-$C_{10}$ aryl, aralkyl;
$R^4, R^5$ are each independently selected from H, $C_1$-$C_6$ alkyl, $C_6$-$C_{10}$ aryl, aralkyl;
$R^6, R^7, R^8$ are each independently selected from H, $OR^3$, $C_1$-$C_6$ alkyl, $C_6$-$C_{10}$ aryl, aralkyl;
$R^9$ is selected from halogen, $C_1$-$C_{10}$ alkyl, $OR^{10}$, $NO_2$, $NR^{11}R^{12}$, CN, C(=O)$R^{10}$, C(=O)$OR^{10}$, S(=O)$CH_3$, wherein said alkyl group is optionally substituted by one or more halogen;
$R^{10}$ is H or $C_1$-$C_3$ alkyl;
$R^{11}, R^{12}$ are each independently selected from H, or $C_1$-$C_{10}$ alkyl;
m, q are 0 or 1;
y is 0, 1 or 2;
n, p are integers each representing the number of repeating units, with
n being superior or equal than 1, and
p being 0 or 1.

In a preferred embodiment, p is 0.

In a preferred aspect of the invention, the compound (C) comprises one or more monomer unit of formula (Ia):

Preferably, the compound comprising a monomer unit of formula (Ia) is tetrasilylmethane $((H_3Si)_4C)$, phenylsilane $(PhSiH_3)$, or N,N-diethyl-1,1-dimethylsilylamine $((Et)_2N—SiH(CH_3)_2)$, tetrasilylmethane and phenylsilane being particularly preferred.

In a still further preferred embodiment, p is 1.

Preferably, R is a bond or $C_1$-$C_6$ alkylene, notably —$CH_2$—$CH_2$—. Alternatively, R is Z, with Z being O or $NR^{10}$, notably NH.

Preferably, the monomer unit is of formula (Ib):

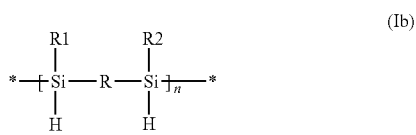

Preferably, the compound (C) comprising a monomer unit of formula (Ib) is tetramethyldisiloxane (($CH_3$)$_2$HSi—O—SiH($CH_3$)$_2$), 1,1,3,3-tetramethyldisilazane (($CH_3$)$_2$HSi—NH—SiH($CH_3$)$_2$), 1,4-disilabutane ($H_3$Si($CH_2$)$_2$Si$H_3$), or tetramethyl-disilane (($CH_3$)$_2$HSi—SiH($CH_3$)$_2$), 1,4-disilabutane being particularly preferred.

Phenylsilane and disilabutane are advantageously commercially available, easy to handle, stable to air and moisture, and can be stored for long periods of time without loss of activity. Finally, tetrasilylmethane, phenylsilane and 1,4-disilabutane have both revealed to be hydrogen carriers with a high hydrogen storage density.

In a particular embodiment, the method of the invention further comprises a step c) of recycling the obtained by-product (C1).

Thus, the method of the invention may further comprises two subsequent steps, after step a):

c) contacting the by-product (C1) with an acyl halide;
d) contacting the obtained product with a metal hydride, thereby regenerating compound (C).

The acyl halide may be notably $CH_3C(=O)Cl$. The metal hydride may be notably an aluminum hydride such as $LiAlH_4$.

As an example, recycling the silylated derivative may be performed according to the following scheme:

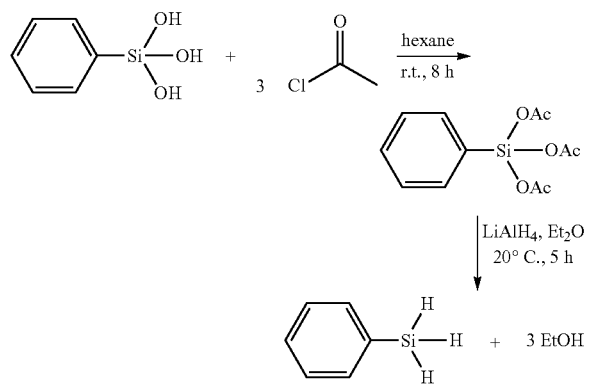

More generally, the invention relates to a method comprising:

i) producing hydrogen from a compound (C); and
ii) recycling the obtained by-product (C1) of step i).

The hydrogen obtained by the method of the invention is recovered, either for storage or for use to produce energy.

In another aspect, the invention relates to a composition comprising a compound (C), a phosphorous based catalyst, a base and water as a solvent as described hereabove.

Particularly preferred compositions are those comprising tetrasilylmethane, phenylsilane or 1,4-disilabutane in combination with a catalytic amount of a phosphorous catalyst and a 10% potassium hydroxide solution.

As a further aspect, the invention relates to the use of a composition according to the invention for producing hydrogen.

In particular, the compositions, or compound (C) in the presence of a catalytic amount of a phosphorous catalyst and a 10% potassium hydroxide solution may be used as a fuel, a propellant or a precursor thereof. As an example, they may be used as a fuel in a fuel cell, in an engine as a NOx reducing agent or as a supplementary fuel or for any other consuming device. As another example, they may be used in a battery.

In an additional aspect, the invention relates to a device for producing hydrogen according to the method hereabove described, said device comprising a reaction chamber comprising:

i. A reaction mixture inlet, said mixture comprising a compound (C), a base in water as a solvent;
ii. an hydrogen outlet;
iii. a by-product collector; and
iv. a surface intended to be in contact with said mixture, coated with a polymer supported catalyst as described hereabove.

Preferably, the device of the invention further comprises a mixing chamber for mixing the compound (C) with the base in water as a solvent, wherein the mixing chamber is connected to the reaction chamber.

Preferably, the device of the invention further comprises a by-product collection chamber, wherein the collection chamber is connected to the reaction chamber.

Preferably, the device of the invention further comprises a second chamber comprising:

v. an outer envelope;
vi. an internal wall separating said chamber into two distinct compartments, namely:
  1. a first compartment containing the reaction mixture to be introduced in the reaction chamber; and
  2. a second compartment containing the by-product (C1) collected from the reaction chamber;
  3. the first and second compartment being each connected to the reaction chamber; and
vii. means for moving the internal wall relative to the outer envelope, so as to make the respective volumes of each compartment to vary.

DEFINITIONS

The following terms and expressions contained herein are defined as follows:

As used herein, the term "about" refers to a range of values from ±10% of a specified value.

As used herein, the term "alkyl" refers to a straight-chain, or branched alkyl group having 1 to 10 carbon atoms, such as methyl, ethyl, propyl, isopropyl, butyl, isobutyl, sec-butyl, tert-butyl, pentyl, isoamyl, neopentyl, 1-ethylpropyl, 3-methylpentyl, 2,2-dimethylbutyl, 2,3-dimethylbutyl, hexyl, octyl.

As used herein, the term "alkoxy" refers to a group alkyl-O—, said alkyl group being as defined herein. Examples of alkoxy groups include notably methoxy, or ethoxy.

As used herein, the term "cycloalkyl" refers to a saturated or partially saturated mono- or bicyclic alkyl ring system containing 3 to 10 carbon atoms. Preferred cycloalkyl groups include those containing 5 or 6 ring carbon atoms. Examples of cycloalkyl groups include such groups as cyclopropyl, cyclobutyl, cyclopentyl, cyclohexyl, cycloheptyl, cyclooctyl, pinenyl, and adamantanyl.

As used herein, the term "aryl" refers to a substituted or unsubstituted, mono- or bicyclic hydrocarbon aromatic ring system having 6 to 12 ring carbon atoms. Examples include phenyl and naphthyl. Preferred aryl groups include unsubstituted or substituted phenyl and naphthyl groups. Included within the definition of "aryl" are fused ring systems, including, for example, ring systems in which an aromatic ring is fused to a cycloalkyl ring. Examples of such fused ring systems include, for example, indane, indene, and tetrahydronaphthalene.

As used herein, the term "arylalkyl" or "aralkyl" refers to an alkyl group that is substituted with an aryl group, wherein the alkyl and aryl groups are as defined above. Examples of arylalkyl groups include, but are not limited to, benzyl, bromobenzyl, phenethyl, benzhydryl, diphenylmethyl, triphenylmethyl, diphenylethyl, and naphthylmethyl.

As used herein, the terms "heterocycle", "heterocyclic" or "heterocyclyl" refer to a substituted or unsubstituted carbocyclic group in which the ring portion includes at least one heteroatom such as O, N, or S. The nitrogen and sulfur heteroatoms may be optionally oxidized, and the nitrogen may be optionally substituted in non-aromatic rings. Heterocycles are intended to include heteroaryl and heterocycloalkyl groups.

As used herein, the term "heterocycloalkyl" refers to a cycloalkyl group in which one or more ring carbon atoms are replaced by at least one hetero atom such as —O—, —N—, or —S—. Examples of heterocycloalkyl groups include pyrrolidinyl, pyrrolinyl, imidazolidinyl, imidazolinyl, pyrazolidinyl, pyrazolinyl, pyrazalinyl, piperidyl, piperazinyl, morpholinyl, thiomorpholinyl, tetrahydrofuranyl, dithiolyl, oxathiolyl, dioxazolyl, oxathiazolyl, pyranyl, oxazinyl, oxathiazinyl, and oxadiazinyl.

As used herein, the term "heteroaryl" refers to an aromatic group containing 5 to 10 ring carbon atoms in which one or more ring carbon atoms are replaced by at least one hetero atom such as —O—, —N—, or —S—. Examples of heteroaryl groups include pyrrolyl, furanyl, thienyl, pyrazolyl, imidazolyl, thiazolyl, isothiazolyl, isoxazolyl, oxazolyl, oxathiolyl, oxadiazolyl, triazolyl, oxatriazolyl, furazanyl, tetrazolyl, pyridyl, pyrazinyl, pyrimidinyl, pyridazinyl, triazinyl, indolyl, isoindolyl, indazolyl, benzofuranyl, isobenzofuranyl, purinyl, quinazolinyl, quinolyl, isoquinolyl, benzoimidazolyl, benzothiazolyl, benzothiophenyl, thianaphthenyl, benzoxazolyl, benzisoxazolyl, cinnolinyl, phthalazinyl, naphthyridinyl, and quinoxalinyl. Included within the definition of "heteroaryl" are fused ring systems, including, for example, ring systems in which an aromatic ring is fused to a heterocycloalkyl ring. Examples of such fused ring systems include, for example, phthalamide, phthalic anhydride, indoline, isoindoline, tetrahydroisoquinoline, chroman, isochroman, chromene, and isochromene.

As used herein, the expression "as needed basis" refers to the ability to control the reactions conditions wherein the amount oh hydrogen is controlled.

EXPERIMENTAL SECTION

All solvents were purified according to reported procedures, and reagents like fluoride salt source, phenylsilane or 1,4-disilabutane were used as commercially available.

Phenylsilane or 1,4-disilabutane were purchased from Sigma-Aldrich company and ABCR company. Tetrasilylmethane was prepared according to literature procedure.

Example 1

Production of Hydrogen Using Phenylsilane Ia in the Presence of a Catalytic Amount of Hexamethylphosphoramide (HMPA)

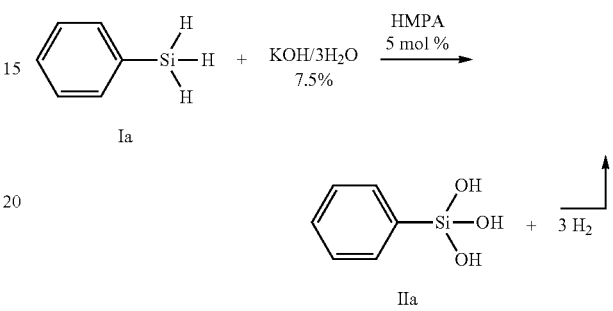

In a two-necked round flask connected to an isobaric equipment consisting of a graduated tube connected to a separator funnel filled with a copper sulfate solution, was placed at 20° C. under air, 28 mg (1.6 $10^{-4}$ mole) of HMPA (5 mol %) and 359 mg (400 μL) of phenylsilane Ia (3.3 $10^{-3}$ mole). 179 μL of KOH (7.5% i water) (9.9 $10^{-3}$ mole) was subsequently slowly introduced. Immediately, an exothermic reaction occurred with an hydrogen gas evolution representing a total volume of 260 mL (98% yield) in less than 10 seconds. The siloxane derivative by-product IIa was obtained as a white solid in a quantitative yield.

Example 2

General Production of Hydrogen Under Various Experimental Conditions Using Phenylsilane Ia (According to Example 1 Experimental Conditions)

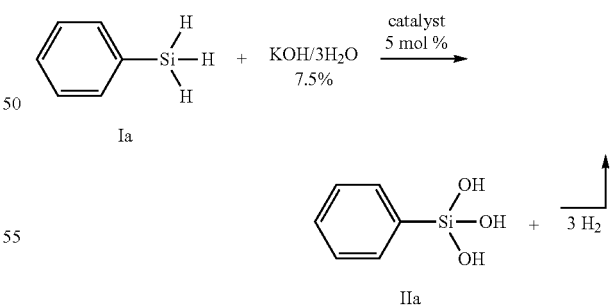

In a two-necked round flask connected to an isobaric equipment consisting of a graduated tube connected to a separator funnel filled with a copper sulfate solution, was placed at 20° C. under air, 1.6 $10^{-4}$ mole of catalyst (5 mol %) and 359 mg (400 μL) of phenylsilane Ia (3.3 $10^{-3}$ mole). 179 μL of KOH (7.5% in water) (9.9 $10^{-3}$ mole) was subsequently slowly introduced. Immediately, an exothermic reaction occurred with an hydrogen gas evolution.

| Entry | Catalyst | Volume H$_2$ (mL) | Time (sec.) |
|---|---|---|---|
| 1 | Ph$_3$P=O (5 mol %) | 30 | 120 |
| 2 | (MeO)$_3$P=O (10 mol %) | 10 | 120 |
| 3 | 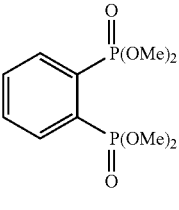 (5 mol %) | 250 (94%) | 60 |
| 4 | 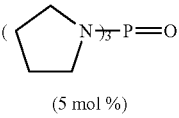 (5 mol %) | 260 (98%) | 5 |
| 5 | 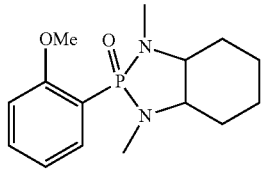 (5 mol %) | 260 (98%) | 30 |

Example 3

Production of Hydrogen Using 1,4-Disilabutane Ib in the Presence of a Catalytic Amount of HMPA

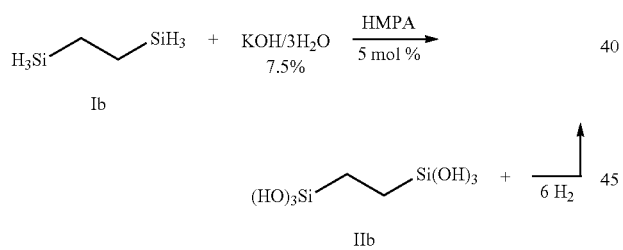

In a two-necked round flask connected to an isobaric equipment consisting of a graduated tube connected to a separator funnel filled with a copper sulfate solution, was placed at 20° C. under air, 28 mg (1.6 10$^{-4}$ mole) of HMPA (5 mol %) and 297 mg (435 μL) of 1,4-disilabutane Ib (3.3 10$^{-3}$ mole). 358 μL of KOH (7.5% i water) (1.98 10$^{-2}$ mole) was subsequently slowly introduced. Immediately, an exothermic reaction occurred with an hydrogen gas evolution representing a total volume of 520 mL (98% yield) in less than 10 seconds. The siloxane derivative by-product IIb was obtained as a white solid in a quantitative yield.

Example 4

Synthesis of Polystyrene Grafted with HMPA Catalyst

A polymeric benzylamine catalyst (Polystyrene AM-NH$_2$ Ref 81553-10G, Aldrich) 250 mg (0.4-1.2 10$^{-3}$ mole) and fresh CDCl$_3$ (5 mL) were added into a dry vial. The mixture was stirred slowly at room temperature, and then K$_2$CO$_3$ (310 mg), DMAP (15 mg), Et$_3$N (0.6 mL) were added. Finally, tetramethylphosphorodiamidic chloride (1.85 mmol, 316 mg, 10-11 equiv.) was added to the above mixture. The reaction mixture was stirred for five days. The polymer resin was finally filtered, washed five times with CHCl$_3$, dried under vacuum and stored at room temperature as a brown solid.

Example 5

Production of Hydrogen Using Phenylsilane Ia in the Presence of a Catalytic Amount of Polystyrene Grafted with HMPA Catalyst

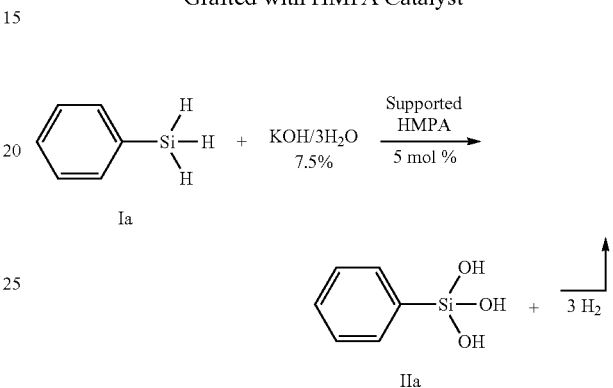

In a two-necked round flask connected to an isobaric equipment consisting of a graduated tube connected to a separator funnel filled with a copper sulfate solution was placed at 20° C. under air of polymeric HMPA catalyst (5 mol %) and 359 mg (400 μL) of phenylsilane Ia (3.3 10$^{-3}$ mole). 179 μL of KOH (7.5% in water) (9.9 10$^{-3}$ mole) was subsequently slowly introduced Immediately, an exothermic reaction occurred with an hydrogen gas evolution representing a total volume of 260 mL (98% yield) in less than 10 seconds. The siloxane derivative by-product IIa was obtained as a white solid in a quantitative yield.

Example 6

Production of Hydrogen Using Phenylsilane Ia in the Presence of a Catalytic Amount of Recycled Polystyrene Grafted with HMPA Catalyst

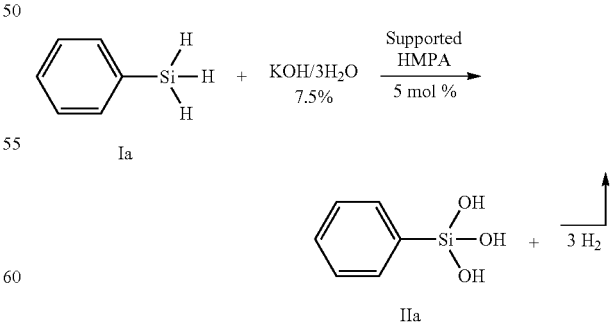

The catalyst used in example 4 was filtered, washed with acetone and dried before to be reused. In a two-necked round flask connected to an isobaric equipment consisting of a graduated tube connected to a separator funnel filled with a copper sulfate solution was placed at 20° C. under air of polymeric HMPA catalyst (5 mol %) and 359 mg (400 μL) of phenylsilane Ia (3.3 $10^{-3}$ mole). 179 μL of KOH (7.5% in water) (9.9 $10^{-3}$ mole) was subsequently slowly introduced. Immediately, an exothermic reaction occurred with an hydrogen gas evolution representing a total volume of 260 mL (98% yield) in less than 10 seconds. The siloxane derivative by-product IIa was obtained as a white solid in a quantitative yield.

Example 7

Production of Hydrogen Using Tetrasilylmethane in the Presence of a Catalytic Amount of HMPA The conditions of example 1 were applied to the production of hydrogen from tetrasilylmethane in the presence of HMPA:

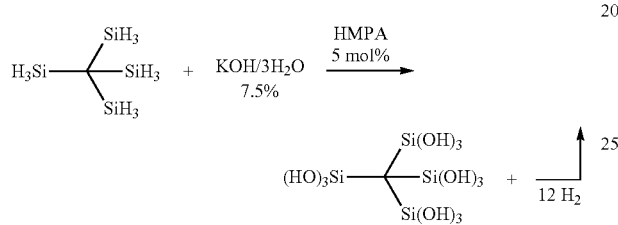

Hydrogen was recovered with 98% yield in 10 seconds.

What is claimed is:

1. A method for producing hydrogen comprising the steps of:
   i) contacting a compound (C) comprising one or more groups Si—H with a phosphorous based catalyst in the presence of a base in water as solvent, thereby forming hydrogen and a by-product (C1);
wherein said phosphorous based catalyst is selected from
   a compound of formula $X^1X^2X^3P(=O)$ wherein:
$X^1, X^2, X^3$ are each, independently selected from $C_1$-$C_6$ alkyl, $C_1$-$C_6$ alkoxy, $NR^aR^b$, $C_6$-$C_{10}$ aryl, aralkyl, 5 to 7 membered heteroaryl;
wherein said alkyl or aryl groups are optionally substituted by one to three $R^e$;
or
$X^1$ and $X^2$ together form with the phosphorous atom to which they are attached a 3 to 10 membered heterocycloalkyl optionally substituted by $R^d$; and $X^3$ is as defined above
or
$X^3$ is -L-P(=O)$X^1X^2$, wherein L is $C_1$-$C_6$ alkylene or $C_6$-$C_{10}$ arylene and $X^1, X^2$ are as defined above; wherein:
$R^a$ and $R^b$ are each independently selected from $C_1$-$C_6$ alkyl, $C_6$-$C_{10}$ aryl or together form with the phosphorous atom to which they are attached a heterocyclyl optionally substituted by one to three $R^e$;
$R^c, R^d$ and $R^e$ are each independently selected from Cl, Br, I, F, OH, $C_1$-$C_6$ alkyl, $C_1$-$C_6$ alkoxy, $NO_2$, $NH_2$, CN, COOH;
   a polymer-supported catalyst bearing one or more groups $R^aR^b(P=O)$—, wherein $R^a$ and $R^b$ are each independently selected from $C_1$-$C_6$ alkyl, $C_6$-$C_{10}$ aryl or together form with the phosphorous atom to which they are attached a heterocyclyl optionally substituted by one to three $R^e$;
   ii) recovering the obtained hydrogen.

2. The method of claim 1, wherein one of $X^1, X^2, X^3$ is $NR^aR^b$.

3. The method of claim 1, wherein $R^a$ and/or $R^b$ are $C_1$-$C_6$ alkyl.

4. The method of claim 1, wherein the phosphorous based catalyst is hexamethylphosphoramide (HMPA).

5. The method of claim 1, wherein the polymer which supports the catalyst is (Aminomethyl)polystyrene.

6. The method of claim 1, wherein the molar ratio of the phosphorous based catalyst relative to compound (C) ranges from 0.01 to 0.1 equivalents.

7. The method of claim 1, wherein the compound (C) comprises one or more monomer units of formula (A):

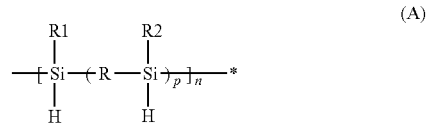

wherein:
R is a bond, $C_1$-$C_6$ alkylene, $(C_1$-$C_4$ alkylene$)_m$-Z—$(C_1$-$C_4$ alkylene$)_q$;
Z is O, $NR^{10}$, S(O)$_y$, $CR^{10}=CR^{10}$, C≡C, $C_6$-$C_{10}$ arylene, 5-10 membered heteroarylene, or $C_3$-$C_6$ cycloalkylene;
$R^1, R^2$ are each independently selected from H, halogen, $C_1$-$C_{10}$ alkyl, $C_3$-$C_{10}$ cycloalkyl, $C_6$-$C_{12}$ aryl, aralkyl, 5 to 10-membered heteroaryl, $OR^3$, $NR^4R^5$, $SiR^6R^7R^8$, wherein said aryl groups are optionally substituted by one to three $R^9$ groups;
$R^3$ is H, $C_1$-$C_6$ alkyl, $C_6$-$C_{10}$ aryl, aralkyl;
$R^4, R^5$ are each independently selected from H, $C_1$-$C_6$ alkyl, $C_6$-$C_{10}$ aryl, aralkyl;
$R^6, R^7, R^8$ are each independently selected from H, $OR^3$, $C_1$-$C_6$ alkyl, $C_6$-$C_{10}$ aryl, aralkyl;
$R^9$ is selected from halogen, $C_1$-$C_{10}$ alkyl, $OR^{10}$, $NO_2$, $NR^{11}R^{12}$, CN, C(=O)$R^{10}$, C(=O)$OR^{10}$, S(=O)$CH_3$, wherein said alkyl group is optionally substituted by one or more halogen;
$R^{10}$ is H or $C_1$-$C_3$ alkyl;
$R^{11}, R^{12}$ are each independently selected from H, or $C_1$-$C_{10}$ alkyl;
m, q are 0 or 1;
y is 0, 1 or 2;
n, p are integers each representing the number of repeating units, with
n being superior or equal than 1, and
p being 0 or 1.

8. The method of claim 7, wherein p is 0.

9. The method of claim 8, wherein the compound (C) comprising a monomer unit of formula (Ia) is $PhSiH_3$.

10. The method of claim 1, wherein the compound (C) comprises a monomer unit of formula $C(SiH_3)_4$.

11. The method of claim 7, wherein p is 1.

12. The method of claim 11, wherein the monomer unit is of formula (Ib):

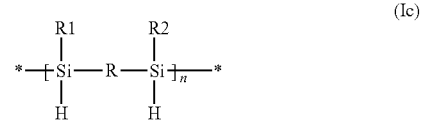

wherein R is $C_1$-$C_6$ alkylene.

13. The method of claim 12, wherein the compound (C) comprising a monomer unit of formula (Ib) is $H_3Si(CH_2)_2SiH_3$.

14. The method of claim 1, wherein the base is an alkaline or alkaline earth metal hydroxide, or benzylamine.

15. The method of claim 1, further comprising the following subsequent recycling steps:
   a) contacting the by-product (C1) with an acyl halide;
   b) contacting the obtained product with a metal hydride, thereby regenerating compound (C).

16. A composition comprising a compound that comprises one or more groups Si—H, a phosphorus based catalyst, a base and water as solvent,
   wherein said phosphorous based catalyst is selected from:
      a compound of formula $X^1X^2X^3P(=O)$ wherein:

$X^1$, $X^2$, $X^3$ are each, independently selected from $C_1$-$C_6$ alkyl, $C_1$-$C_6$ alkoxy, $NR^aR^b$, $C_6$-$C_{10}$ aryl, aralkyl, 5 to 7 membered heteroaryl;
   wherein said alkyl or aryl groups are optionally substituted by one to three $R^c$; or
   $X^1$ and $X^2$ together form with the phosphorous atom to which they are attached a 3 to 10 membered heterocycloalkyl optionally substituted by $R^d$; and $X^3$ is as defined above or
   $X^3$ is -L-P(=O)$X^1X^2$, wherein L is $C_1$-$C_6$ alkylene or $C_6$-$C_{10}$ arylene and $X^1$, $X^2$ are as defined above ;
   $R^a$ and $R^b$ are each independently selected from $C_1$-$C_6$ alkyl, $C_6$-$C_{10}$ aryl or together form with the phosphorous atom to which they are attached a heterocyclyl optionally substituted by one to three $R^e$;
   $R^c$, $R^d$ and $R^e$ are each independently selected from Cl, Br, I, F, OH, $C_1$-$C_6$ alkyl, $C_1$-$C_6$ alkoxy, $NO_2$, $NH_2$, CN, COOH;
      a polymer-supported catalyst bearing one or more groups $R^aR^b(P=O)$—, wherein $R^a$ and $R^b$ are each independently selected from $C_1$-$C_6$ alkyl, $C_6$-$C_{10}$ aryl or together form with the phosphorous atom to which they are attached a heterocyclyl optionally substituted by one to three $R^e$.

17. A device for producing hydrogen according to the method of claim 1, said device comprising a reaction chamber comprising:
   i. A reaction mixture inlet, said mixture comprising a compound (C), a base in water as a solvent;
   ii. an hydrogen outlet;
   iii. a by-product collector; and
   iv. a surface intended to be in contact with said mixture, coated with a polymer supported catalyst selected from:
      a compound of formula $X^1X^2X^3P(=O)$ wherein:

$X^1$, $X^2$, $X^3$ are each, independently selected from $C_1$-$C_6$ alkyl, $C_1$-$C_6$ alkoxy, $NR^aR^b$, $C_6$-$C_{10}$ aryl, aralkyl, 5 to 7 membered heteroaryl;
   wherein said alkyl or aryl groups are optionally substituted by one to three $R^c$; or
   $X^1$ and $X^2$ together form with the phosphorous atom to which they are attached a 3 to 10 membered heterocycloalkyl optionally substituted by $R^d$; and $X^3$ is as defined above or
   $X^3$ is -L-P(=O) $X^1X^2$, wherein L is $C_1$-$C_6$ alkylene or $C_6$-$C_{10}$ arylene and $X^1$, $X^2$ are as defined above;
   $R^a$ and $R^b$ are each independently selected from $C_1$-$C_6$ alkyl, $C_6$-$C_{10}$ aryl or together form with the phosphorous atom to which they are attached a heterocyclyl optionally substituted by one to three $R^e$;
   $R^c$, $R^d$ and Re are each independently selected from Cl, Br, I, F, OH, $C_1$-$C_6$ alkyl, $C_1$-$C_6$ alkoxy, $NO_2$, $NH_2$, CN, COOH;
      a polymer-supported catalyst bearing one or more groups $R^aR^b(P=O)$—, wherein $R^a$ and $R^b$ are each independently selected from $C_1$-$C_6$ alkyl, $C_6$-$C_{10}$ aryl or together form with the phosphorous atom to which they are attached a heterocyclyl optionally substituted by one to three $R^e$.

18. The device of claim 17, further comprising a mixing chamber for mixing the compound (C) with the base in water as a solvent, wherein the mixing chamber is connected to the reaction chamber.

19. The device of claim 17 further comprising a by-product collection chamber, wherein the collection chamber is connected to the reaction chamber.

20. The device of claim 17, further comprising a second chamber comprising:
   v. an outer envelope;
   vi. an internal wall separating said chamber into two distinct compartments, namely:
      1. a first compartment containing the reaction mixture to be introduced in the reaction chamber; and
      2. a second compartment containing the by-product (C1) collected from the reaction chamber;
      3. the first and second compartment being each connected to the reaction chamber;
   and
   vii. means for moving the internal wall relative to the outer envelope, so as to make the respective volumes of each compartment to vary.

* * * * *